G. H. BUGENHAGEN.
ENDLESS CHAIN TRACTOR.
APPLICATION FILED DEC. 12, 1918.
1,369,392.
Patented Feb. 22, 1921.
2 SHEETS—SHEET 1.
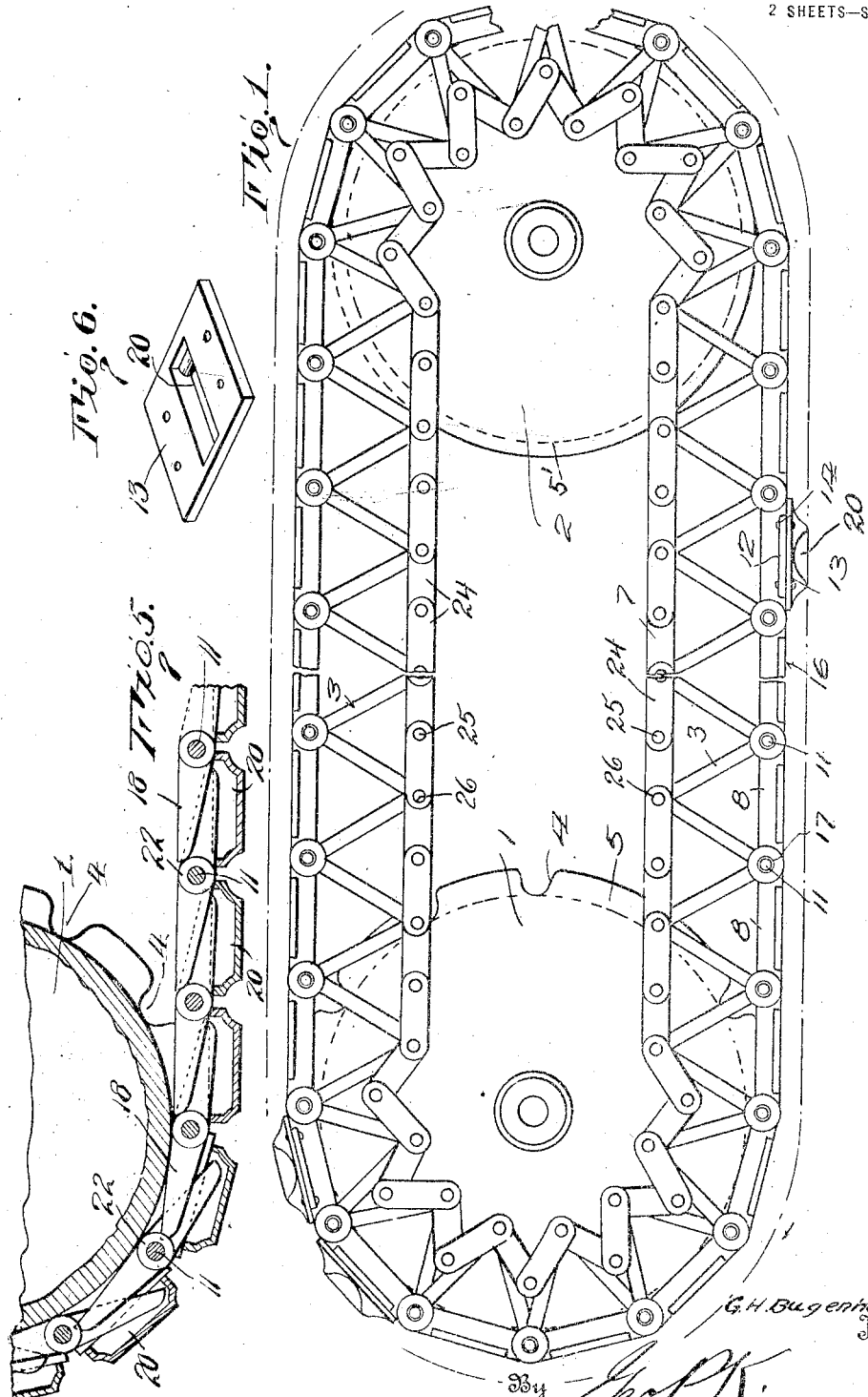

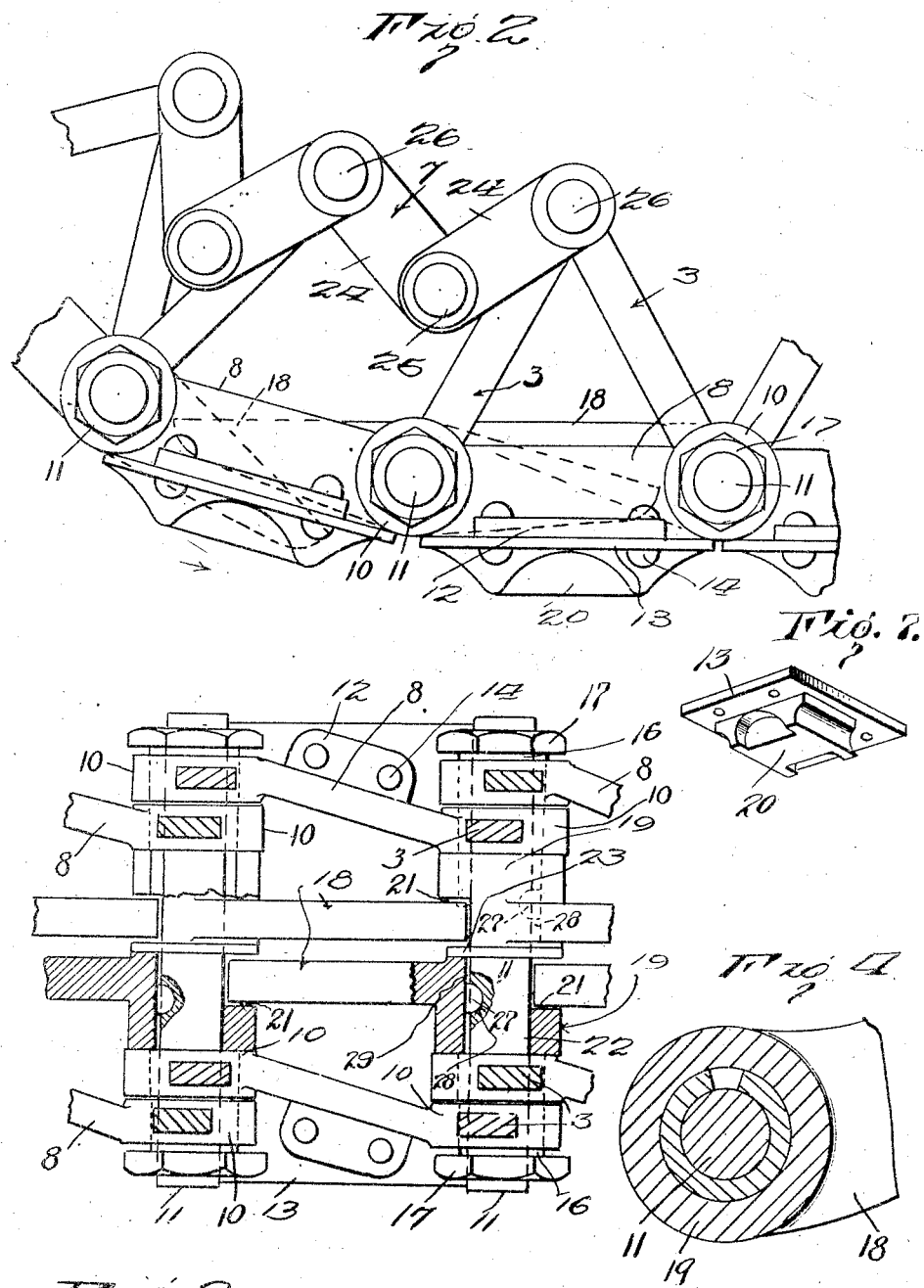

UNITED STATES PATENT OFFICE.

GEORGE H. BUGENHAGEN, OF MINOT, NORTH DAKOTA.

ENDLESS-CHAIN TRACTOR.

1,369,392.     Specification of Letters Patent.     Patented Feb. 22, 1921.

Application filed December 12, 1918. Serial No. 266,457.

*To all whom it may concern:*

Be it known that I, GEORGE H. BUGENHAGEN, a citizen of the United States, residing at Minot, in the county of Ward and State of North Dakota, have invented certain new and useful Improvements in Endless Chain Tractors, of which the following is a specification.

This invention relates to tractors, more particularly to the class of endless chain tractors, and has for one of its objects to improve the construction and increase the efficiency of the tread portions of the devices of this character.

Another object of the invention is to provide a device of this character provided with a truss like arrangement whereby the tread is supported between the carrier wheels without the necessity for employing the usual tread wheels.

Another object of the invention is to provide a device of this character of improved arrangement of the coupling links to insure increased efficiency of the operation.

Another object of the invention is to provide a device of this character having means whereby lateral thrust or displacement is obviated.

Other objects as well as the nature, characteristic features, and scope of this invention will be more readily apparent from the following description taken in connection with the accompanying drawings and pointed out in the claims, forming a part of this specification.

The invention is clearly illustrated in the accompanying drawings, in which:—

Figure 1 is a side elevation.

Fig. 2 is an enlarged side elevation of a portion of one of the chains showing the relative position of the parts when passing around one of the wheels.

Fig. 3 is an enlarged horizontal section through one of the chains and looking toward the inner face of the tread thereof, and Fig. 4 is an enlarged transverse section of the bushing between the links and the axle or pin.

Fig. 5 is a sectional detail illustrating the construction and operation of the links.

Fig. 6 is a detached perspective view of the base frame of the shoes, viewed from the inner side.

Fig. 7 is a detached perspective view of the base frame of the shoes viewed from the road engaging side.

Similar characters of reference are employed in all of the above described views to indicate corresponding parts.

The improved device includes a driver wheel 1 and a pilot wheel 2 over which the improved trussed chain tread operates. The outer surface of the driver wheel is provided with transverse recesses or grooves 4 to provide teeth for the chain tread, and in addition is formed with a peripheral groove medially of its edges as indicated by dotted line 5, for a purpose that will presently appear, while the pilot wheel may be formed with a smooth surface throughout, except for a similar peripheral groove indicated by the dotted line 5'.

The improved device consists generally of outer chains each having a truss construction for coacting with and supporting inner collapsible chains. Specifically, the outer chain is composed of a plurality of triangular shaped links each including a base portion 8 and diverging portions 3, or arranged in opposed relation with each other, the base portions 8 being diagonally disposed so as to position the bearings 10 at the ends thereof out of alinement to enable the bearings to engage face to face upon the connecting pins or pintles 11. In addition, the base portions 8 are formed with lateral flanges 12 to which are connected the tread shoes 13, the latter being disposed transversely of the chain and connected to the flanges on opposing links by fasteners 14. In addition, the inner surfaces of these shoes are provided medially of their side edges with cups or cavities 20 for a purpose that will presently appear. The outermost bearings 10 on the portion 8 are fitted with wear bushings 16, through which the pintles 11 extend and secured in place by suitable devices such as holding nuts 17.

Coacting with the peripheral groove 5 on the driver wheel and with the corresponding groove 5' on the pilot wheel are guiding members 18 each guiding member having a terminal sleeve portion 19. In addition, each sleeve portion 19 is recessed as at 21 at one end to receive the free end of the arm 18 of the next link. The sleeves are rigidly connected with the pins or pintles 11 in any desired manner, and are protected from undue wear by bearing washers 23 disposed between them. The arms 18 at one side of the center of the pintles 11 extend in one direction and in alinement with each other, while the arms 18 at the other side extend in alinement with each other but in the opposite direction, the arrangement being clearly indicated in Fig. 3, so that the last mentioned arms coact with the groove of the driver wheel, while the first mentioned arms coact with the corresponding groove 5′ in the pilot wheel when the movement of the tread is in one direction, but the action is vice versa when the movement is in the opposite direction. The cups 20 in the shoes receive the outer portions of the arms 18 when the tread is passing around the wheels, as shown in Fig. 5.

The converging portions 3 of the truss chain are formed with bearings to receive pintles 26 of coupling chains designated as a whole at 7.

The chains 7 consist of a plurality of opposed pairs of links 24 the adjacent ends of which are pivoted together as at 25, while the outer ends are pivoted to the pintles 26 of the triangular links. The links 24 are relatively short and each pair is arranged between the adjacent triangular links, so that when the tread is passing about the wheels the links will swing about their pivots as indicated in Fig. 1, having in effect a substantial collapsible action insuring the effective operation of the tread in its entirety about the wheels, and in addition when straightened between the driving and pilot wheels, operate to maintain the entire tread rigid between the main supporting wheels, as is apparent.

In use, as the tread chains move in a direction as indicated by the arrow, the sleeve portions 19 of the members 18 will be engaged by the recesses or grooves 4 of the driver 1, while the corresponding arms 18 will operate in the peripheral groove 5 to coact therewith in guiding the relative movement of the tread with respect to the wheels and effectually preventing lateral displacement of the chains and treads. Likewise these same arms 18 will coact with the corresponding peripheral groove 5′ in the pilot wheel 2. During the time the arms coact with the grooves the links 24 forming the inner chain 7 will collapse, that is, they will move relative to each other to permit of the tread moving about the wheels 1 and 2. The bushings 16 take up the wear, keep the outer chains in proper position and within predetermined limits. When the collapsible chains 7 are straightened out between the two wheels they operate as braces to the truss chains composed of the triangular links, and these two systems of chains coöperate so that the portion between the wheels which engages the ground will be held substantially rigid, thereby obviating the employment of the tread wheels which are now used on practically all crawler type tractors. The constant renewal of the tread wheels owing to the excessive wear, et cetera, is very expensive, while the present trussed chain construction is cheaper and more effective in operation.

The coacting arms 18 are an important feature in the construction as they receive the lateral thrust when the chains are passing around the wheels 1 and 2, and relieve the chains very largely from such strains.

The arms 18 as before stated, are rigidly coupled to the pintles 11, for instance by "fins" or "blocks" 27 fitting in suitable recesses or seats 28 in the pins 11, and engaging in key ways or channels 29 in the hubs or sleeves 19, in a well known manner as shown in Fig. 3.

By this means the arms of each pin are rigidly coupled thereto and vibrate therewith.

The arms which extend in one direction form a track for the driver wheel 1 and the arms which extend in the opposite direction form a track for the pilot wheel 2.

Thus when the machine is moving forwardly the arms which extend in one direction serve as a track to the pilot wheel, while the other arms move as idlers and are received at their outer ends in the pockets 20 of the shoes 13, as they move around the wheels, and when the machine moves in the opposite direction the arms will operate in reverse order, as will be obvious.

What is claimed as new is—

1. In an apparatus of the class described, a driving wheel and a pilot wheel provided respectively with peripheral grooves, coacting traction tread devices in spaced relation and each formed with a plurality of links hingedly coupled by transversely directed pintles and operating around said wheels at opposite sides of the grooves thereof, and track arms rigidly connected to said pintles and extending in opposite directions therefrom and in longitudinal alinement, the arms which extend in one direction operating in the grooves of the wheels and the arms which extend in the opposite direction running idle when the machine is moving in one direction, and the operation of the track arms reversed when the machine is moving in the opposite direction.

2. In an apparatus of the class described, a driving wheel and pilot wheel, coacting traction tread devices in spaced relation and each formed with plurality of links hingedly coupled by transversely directed pintles and operating around said wheels, and track arms rigidly connected to said pintles and extending in opposite directions therefrom and in longitudinal alinement.

3. In an apparatus of the class described, a driving wheel and pilot wheel, traction tread device formed of a plurality of links hingedly coupled by transversely directed pintles and operating around said wheels, and track arms rigidly connected to said pintles and extending in opposite directions therefrom and in longitudinal alinement.

In testimony whereof, I affix my signature hereto.

GEORGE H. BUGENHAGEN.